US009831517B2

(12) United States Patent
Yu et al.

(10) Patent No.: US 9,831,517 B2
(45) Date of Patent: Nov. 28, 2017

(54) UNIT CELL OF SOLID OXIDE FUEL CELL, STACK USING THE UNIT CELL, AND METHODS OF MANUFACTURING THE UNIT CELL AND THE STACK

(71) Applicant: KOREA INSTITUTE OF ENERGY RESEARCH, Daejeon (KR)

(72) Inventors: Ji Haeng Yu, Daejeon (KR); Jong Hoon Joo, Cheongju-si (KR); Chung-Yul Yoo, Daejeon (KR)

(73) Assignee: KOEA INSTITUTE OF ENERGY RESEARCH, Daejeon (KR)

( * ) Notice: Subject to any disclaimer, the term of this patent is extended or adjusted under 35 U.S.C. 154(b) by 145 days.

(21) Appl. No.: 14/838,138

(22) Filed: Aug. 27, 2015

(65) Prior Publication Data

US 2016/0064767 A1    Mar. 3, 2016

(30) Foreign Application Priority Data

Aug. 27, 2014    (KR) .................. 10-2014-0112077

(51) Int. Cl.
*H01M 8/12*        (2016.01)
*H01M 8/1231*      (2016.01)
*H01M 8/2485*      (2016.01)
*H01M 8/0273*      (2016.01)
*H01M 4/86*        (2006.01)
(Continued)

(52) U.S. Cl.
CPC ....... *H01M 8/1231* (2016.02); *H01M 4/8652* (2013.01); *H01M 4/8857* (2013.01); *H01M 4/9066* (2013.01); *H01M 8/0215* (2013.01); *H01M 8/0273* (2013.01); *H01M 8/1253* (2013.01); *H01M 8/2485* (2013.01); *H01M 2008/1293* (2013.01);
(Continued)

(58) Field of Classification Search
CPC ............ H01M 8/0215; H01M 8/0276; H01M 8/1231; H01M 8/1253; H01M 8/2485
USPC ........................................ 429/461
See application file for complete search history.

(56) References Cited

U.S. PATENT DOCUMENTS

2010/0047656 A1*    2/2010    Li ................. H01M 8/1213
                                                            429/486
2010/0178589 A1*    7/2010    Kwon ............ H01M 4/9033
                                                            429/507

(Continued)

FOREIGN PATENT DOCUMENTS

KR        10-1151868 B1    5/2012

*Primary Examiner* — Basia A Ridley
*Assistant Examiner* — James M Erwin
(74) *Attorney, Agent, or Firm* — Knobbe Martens Olson & Bear LLP

(57) ABSTRACT

A unit cell includes an air inlet/outlet that is formed on a frame unit rather than being installed in a fuel electrode (anode) to simplify a sealing process, and accordingly, a continuous process using a tape casting technique may be performed. In addition, an electrolyte material that is in contact with an air electrode (cathode) in the frame unit is optimized to improve ion conductivity and a porosity of an upper layer material of the fuel electrode unit is optimized to increase fuel diffusion from a gas channel to an electrolyte layer. In addition, a sealing process performed inside the unit cell or between the unit cells of the stack is stabilized and strongly maintained, and thus a fuel cell using the unit cell and the stack disclosed herein may have excellent economic feasibility and high energy efficiency.

12 Claims, 11 Drawing Sheets

(51) Int. Cl.
*H01M 8/1253* (2016.01)
*H01M 4/88* (2006.01)
*H01M 4/90* (2006.01)
*H01M 8/0215* (2016.01)
*H01M 8/124* (2016.01)

(52) U.S. Cl.
CPC .... *H01M 2300/0077* (2013.01); *Y02E 60/525* (2013.01); *Y02P 70/56* (2015.11)

(56) References Cited

U.S. PATENT DOCUMENTS

| | | | |
|---|---|---|---|
| 2011/0200910 A1* | 8/2011 | Wachsman | H01M 4/8657 429/480 |
| 2012/0141904 A1* | 6/2012 | Badding | H01M 8/124 429/461 |
| 2014/0170522 A1* | 6/2014 | Hotta | H01M 8/1213 429/470 |
| 2015/0024299 A1 | 1/2015 | Yu et al. | |

* cited by examiner

UNIT CELL OF SOLID OXIDE FUEL CELL, STACK USING THE UNIT CELL, AND METHODS OF MANUFACTURING THE UNIT CELL AND THE STACK

STATEMENT OF GOVERNMENT SUPPORT

The invention was made with government support under the Energy Efficiency & Resources of the Korea Institute of Energy Technology Evaluation and Planning (KETEP) grant awarded by the Korean government Ministry of Knowledge Economy.

CROSS-REFERENCE TO RELATED APPLICATIONS

This application claims the benefit of Korean Patent Application NO. 2014-0112077 filed Aug. 27, 2014 in the Korean Intellectual Property Office, disclosure of which is incorporated herein by reference.

BACKGROUND

Field

The present disclosure relates to a unit cell of a solid oxide fuel cell, a stack using the unit cell, and methods of manufacturing the unit cell and the stack.

Description of the Related Technology

In a fuel cell, oxygen and fuel gas are supplied to an air electrode and a fuel gas, respectively, and accordingly, an electrochemical reaction concerned as a reverse reaction of water proceeds to generate electricity, heat, and water. In this regard, the fuel cell may generate high-efficiency electricity without causing pollution. In particular, a solid oxide fuel cell (SOFC) is an example of the fuel cell. Based on some advantages of the SOFC, studies on the SOFC have been actively made in the United States and Japan.

Korean Patent No. 1,151,868 relates to an SOFC and discloses a structure of a unit cell of the SOFC.

SUMMARY

The present inventors design a unit cell in which a flat-tubular unit cell is integrally assembled with a ceramic frame to arrange an air inlet/outlet in the ceramic frame and a ceramic interconnect layers to make electrical connection with another unit cell. Accordingly, the air inlet/outlet is separated from a fuel inlet/outlet, thereby simplifying a sealing process. In addition, the present inventors figure out a laminating method using a ceramic tape to enable reliable, mass production of the unit cell, thereby completing the present invention.

One aspect of the present invention provides a unit cell of a solid oxide fuel cell (SOFC), the unit cell including the fuel electrode unit having a gas channel formed therein for a fuel flow; a frame formed of a same material with an electrolyte material and configured to contact and surround the fuel electrode unit and include an aperture formed in a central part that is in contact with a bottom surface of the fuel electrode unit; an interconnector coated on the aperture of the frame and configured to contact the bottom surface of the fuel electrode unit; and an air electrode unit coated on an upper surface of the frame that is in contact with an upper surface of the fuel electrode unit, wherein the frame includes a fuel inlet/outlet and an air inlet/outlet, wherein the fuel inlet/outlet is connected to each of both ends of the gas channels of the fuel electrode unit to penetrate front and rear surfaces of the frame in a vertical direction, and the air inlet/outlet penetrates both side surfaces of the frame in a vertical direction to supply air to the air electrode unit.

In the unit cell according to an embodiment, the gas channels may be in a tube, lattice, or honeycomb type.

In the unit cell according to an embodiment, a material for forming the frame may include $Y_2O_3$-doped zirconia in a concentration of about 3 mol % to about 8 mol %.

In the unit cell according to an embodiment, a material for forming a part of the frame that is in contact with the upper surface, which is coated with the air electrode unit, of the fuel electrode may include at least one selected from zirconia including scandium (Sc) or ytterbium (Yb), ceria including yttrium (Y), gadolinium (Gd), or samarium (Sm), and $LaGaO_3$ including both strontium (Sr) and magnesium (Mg).

In the unit cell according to an embodiment, a material for forming the fuel electrode unit may include a composite including an ion conductive electrolyte material and at least one selected from nickel, a nickel alloy, and an iron-based alloy, wherein the ion conductive electrolyte material may include at least one selected from yttria-stabilized zirconia (YSZ), scandia-stabilized zirconia (ScSZ), Gd doped-ceria (GDC), Sm doped-ceria, and lanthanum gallates.

In the unit cell according to an embodiment, the interconnector may include a composite including ceramic and an ion conductive electrolyte material, wherein the ceramic may include at least one selected from strontium titanium ferrite (STF), lanthanum strontium ferrite, LSF), LSF including Sc (LSF(Sc)), lanthanum calcium ferrite (LCF), lanthanum strontium manganite (LSM), lanthanum strontium cobatite (LSC), lanthanum strontium chromite (LSCr), lanthanum strontium cobalt ferrite (LSCF), manganese ferrite ($MnFe_2O_4$), and nickel ferrite ($NiFe_2O_4$), and the ion conductive electrolyte material may include at least one selected from Gd doped-ceria (GDC) and La doped-ceria.

In the unit cell according to an embodiment, the fuel electrode unit may include a fuel diffusion layer and a fuel electrode support that have a different porosity from each other, wherein the fuel diffusion layer may have a porosity of at least about 30%, and an upper surface of the fuel diffusion layer may be in contact with an inner surface of the frame and a bottom surface of the fuel diffusion layer may be in contact with the fuel electrode support, to thereby form the fuel flow passage unit.

In the unit cell of the SOFC according to an embodiment, the fuel electrode unit may be formed of a composite including nickel (Ni) and YSZ, and a Ni-GDC composite layer may be further included between the fuel electrode unit and the interconnector.

According to another aspect of the present invention, provided is a method of manufacturing a unit cell of a solid oxide fuel cell (SOFC), the method including:

preparing an upper layer of a frame, upper/intermediate/bottom layers of a fuel electrode unit, and an interconnecting layer, wherein the upper layer of the frame is formed of a same material with an electrolyte material; the upper/intermediate/bottom layers of the fuel electrode unit are surrounded by the frame that includes a first border as a portion of the frame formed of the same material with the electrolyte material and the fuel electrode unit positioned inside the first border; and the interconnecting layer is surrounded by the frame that includes a second border as a portion of the frame formed of the same electrolyte material with the electrolyte material and a ceramic interconnector positioned inside the second border, processing a space for a fuel flow passage unit, the gas channels being extended from a predetermined position on a portion of the first border with respect to the intermediate layer of the fuel electrode unit to a predetermined position on another portion opposite to the one portion of the same first border by penetrating the upper/intermediate/bottom layers of the fuel electrode unit layer;

laminating the interconnecting layer surrounded by the frame, the bottom/intermediate/upper layers of the fuel electrode unit surrounded by the frame, and the upper surface of the frame sequentially in the stated order;

processing an air inlet/outlet and a fuel inlet/outlet, wherein the air inlet/outlet penetrates both side surfaces of the laminated frame and the fuel inlet/outlet penetrates front and rear parts of the frame to be connected with the gas channels;

manufacturing a half-cell by performing heat treatment on the laminated structure including the air inlet/outlet and the fuel inlet/outlet;

applying a coating of a material for forming an air electrode unit to a central part of an upper surface of the upper layer of the frame that constitutes the half-cell, thereby manufacturing a coated structure; and heat-treating the coated structure.

In the method of manufacturing the unit cell of the SOFC according to an embodiment, the upper layer of the frame, the upper/intermediate/bottom layers of the fuel electrode unit, and the interconnecting layer may be prepared according to a tape casting technique; the air electrode unit material layer may be coated according to a screen printing technique; the material for forming the frame may include 3 mol % $Y_2O_3$-doped zirconia; the material for forming a part of the frame that is in contact with the upper surface, which is coated with the air electrode unit, of the fuel electrode may include at least one selected from zirconia including Sc or Yb, Y, ceria including Y, Gd, or Sm, and $LaGaO_3$ including both Sr and Mg; and the upper layer of the fuel electrode unit may have a porosity different from that of the intermediate/bottom layers of the fuel electrode unit, wherein the upper layer of the fuel electrode unit may have a porosity of at least about 30%.

According to another aspect of the present invention, provided is a stack of a solid oxide fuel cell (SOFC) using the unit cell, the stack including:

a plurality of unit cells, each of which includes a fuel inlet/outlet and an air inlet/outlet formed inside a frame;

wherein the plurality of the unit cells are sequentially laminated to dispose an airflow layer between an air electrode unit included in one unit cell of the plurality of the unit cells and an interconnector included in another unit cell of the plurality of the unit cells, the airflow layer includes a frame border including a fuel inlet/outlet and an air inlet/outlet, and the air inlet/out and the fuel inlet/outlet is connected with the plurality of the unit cells, and each of the plurality of the unit cells is the unit cell of the SOFC described above.

In an embodiment, the airflow layer included in the stack may be in a tube, lattice, or honeycomb type.

According to another aspect of the present invention, provided is a method of manufacturing a stack of a solid oxide fuel cell (SOFC) according to a tape casting process, the method including:

preparing a plurality of upper layers of a frame, a plurality of upper/bottom/bottom layers of a fuel electrode unit, a plurality of interconnecting layers, and a plurality of airflow layers, wherein each of the plurality of the upper layers of the frame has a surface coated with an air electrode unit, each of the plurality of the upper/bottom layers of the fuel electrode unit includes a plurality of first borders, each of which serves as a portion of the frame and includes a fuel electrode unit, each of the plurality of the intermediate layers includes a gas channel, each of the plurality of the interconnecting layers includes a plurality of second borders, each of which serves as a portion of the frame and includes an interconnector, and each of the plurality of the airflow layers includes the plurality of the second borders, each of which includes an airflow unit;

laminating one of the plurality of the airflow layers, one of the plurality of the interconnecting layers, one of the plurality of the bottom layers/intermediate/upper layers of the fuel electrode unit, and one of the plurality of the upper layers of the frame sequentially in the stated order, thereby manufacturing a laminated frame;

processing an air inlet/outlet and a fuel inlet/outlet, wherein the air inlet/outlet penetrates both side surfaces of the laminated frame in a vertical direction to be connect with the airflow unit, and the fuel inlet/outlet penetrates front and rear surfaces of the frame in a vertical direction to be connected with the gas channels;

manufacturing a laminated structure by repeating the laminating and the processing as many times as a predetermined number of times to have a bottom surface of the airflow layer in contact with the upper layer of the frame and to connect the air inlet/outlet and the airflow unit each other; and heat-treating the laminated structure.

In the method of manufacturing the stack of the SOFC using the unit cells according to an embodiment, the upper layer of the frame, the upper/intermediate/bottom layers of the fuel electrode unit, and the interconnecting layer may be prepared according to a tape casting technique; the air electrode unit material layer may be coated according to a screen printing technique; the material for forming the frame may include 3 mol % $Y_2O_3$-doped zirconia; the material for forming a part of the frame that is in contact with the upper surface, which is coated with the air electrode unit, of the fuel electrode may include at least one selected from zirconia including Sc or Yb, Y, ceria including Y, Gd, or Sm, and $LaGaO_3$ including both Sr and Mg; and the upper layer of the fuel electrode unit may have a porosity different from that of the intermediate/bottom layers of the fuel electrode unit, wherein the upper layer of the fuel electrode unit may have a porosity of at least about 30%.

A unit cell of a fuel cell and a stack using the unit cell according to one or more embodiments of the present invention include an air inlet/outlet formed on a frame rather than in a fuel electrode (anode), and thus an additional manual sealing process is not required. In this regard, a continuous process using a tape casting technique may be performed to maximize a processing efficiency. In addition, an electrolyte material for forming a part of the frame that is in contact with an air electrode is optimized, so as to improve ion conductivity. In addition, a porosity of a material for forming an upper layer of the fuel electrode unit is optimized, so as to improve fuel diffusion from a gas channel to an electrolyte layer. Thus, when a fuel cell includes the unit cell and the stack using the unit cell according to one or more embodiments of the present invention, the fuel cell may have excellent economic feasibility and high energy efficiency.

DETAILED DESCRIPTION OF EMBODIMENTS

Figure 1:
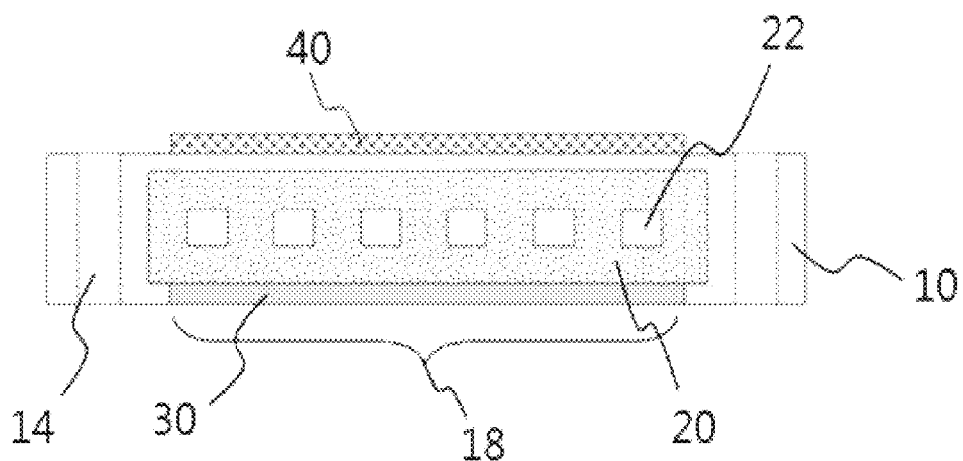
FIG. 1 is a cross-sectional view of a unit cell of a solid oxide fuel cell (SOFC) in which an upper surface of a frame constituting the SOFC is formed of a same material with a material used for forming an electrolyte frame.

Reference will now be made in detail to embodiments, examples of which are illustrated in the accompanying drawings, wherein like reference numerals refer to like elements throughout. In this regard, the present embodiments may have different forms and should not be construed as being limited to the descriptions set forth herein. Accordingly, the embodiments are merely described below, by referring to the figures, to explain aspects. Expressions such as "at least one of," when preceding a list of elements, modify the entire list of elements and do not modify the individual elements of the list.

A solid oxide fuel cell (SOFC) is an example of the fuel cell, in which a solid metal oxide is used as an electrolyte and an oxygen ion ($O^{2-}$) is transported from an air electrode (cathode) to a fuel electrode (anode). Since the SOFC operates at high temperatures, a noble metal catalyst is not required, and a variety of fuels may be used through a direct internal reforming process. In addition, since the SOFC discharges high-temperature gas, waste heat generated therefrom may be used for thermal hybrid power generation.

The SOFC may be classified into a planar type and a tubular type according to a structure of the SOFC. The tubular type may be further classified into a circular tube type and a flat tube type, wherein a flat tube-type fuel cell is flattened to facilitate stacking of unit cells. To improve an output density of the SOFC, a method of reducing resistance of a unit cell by depositing a thin film electrolyte on an electrode support is typically used in manufacturing of a planar or tubular fuel cell.

In regard to a unit cell of the planar-type SOFC, use of a metal or ceramic interconnect may facilitate stacking and current collecting of the unit cell. However, it is difficult to produce a large-area planar unit cell, and a separate sealant is required to isolate flows of fuel and air at upper and lower parts of the unit cell. A metal interconnector (e.g., an alloy, such as stainless steel), which is typically used as an interconnect that blocks the flows of fuel and air among stacked planar unit cells, and at the same time, interconnects the unit cells serially in a circuit, may have corrosion at high temperatures or deterioration of performance of the SOFC owing to a reaction between chromium (Cr) evaporated from a stainless steel alloy and an air electrode (cathode) of the unit cell of the SOFC. Such corrosion and/or deterioration associated with the interconnector have a critical effect on determining durability of a stack of the SOFC. Thus, as an alternative, there are ongoing studies on a ceramic interconnector.

In regard to a unit cell of the tubular-type SOFC, the unit cell has a strong mechanical strength and seals both ends or only one end of the unit cell, thereby having a both-end closed unit cell or a single-end closed unit cell. In this regard, a sealing area of the unit cell may be relatively smaller than that of the unit cell of the planar-type SOFC, and thus flows of gas inside and outside of the unit of the tubular-type SOFC may be easily controlled. However, in a stack of the tubular-type SOFC, a sealing area for sealing the unit cell and a gas manifold occupies a large volume, and accordingly, the stack having a compact structure may not be easily manufactured. In addition, since a reaction area of the unit cell is reduced as much as the sealing area, manufacturing costs of the unit cell may increase. In regard to the tubular-type SOFC, a unit cell of a circular tube-type SOFC has a circular cross-section, which makes it difficult to configure a stack of the circular tube-type SOFC and causes an increase in resistance of the unit cell. Also, since a unit cell of a flat tube-type SOFC has a rectangular cross-section, which requires use of a gas manifold having a rectangular cross-section, manufacturing the gas manifold in an exact size may be difficult, a risk of gas leak may be high, and manufacturing costs of the unit cell may also increase.

In an example of an SOFC, a structure of a unit cell of the SOFC is configured to implement flows of fuel and air at the same time in the unit cell, so as to prepare a compact stack by laminating unit cells of a flat-tube-type SOFC. However, since the structure includes an air inlet/outlet, which penetrates a fuel electrode (anode), on both sides of the fuel electrode (anode), a separate sealing process is required in a manual manner. In addition, a process of manufacturing an anode support by extrusion (i.e., a process of preparation of extrusion slurry-extrusion-drying-pre-sintering) is performed separately from a process of depositing an electrolyte and an interconnector (i.e., a process of electrolyte slurry preparation, dip-coating, drying, firing and a process of ceramic interconnect slurry preparation, coating, drying, co-firing). In this regard, an overall preparation method takes a long period of time and a multi-step process, and consequently, a defect rate of the product may increase.

Therefore, an aspect of the invention provides a unit cell of the flat-tube-type SOFC ensuring durability thereof by simplifying a sealing process while maintaining a compact structure thereof, and at the same time, being capable of carrying out continuous production using a reliable process.

Some aspects of the present invention provide (1) a unit cell of a flat-tube-type solid oxide fuel cell (SOFC), wherein air inlet/outlet is separated from anode, (2) a stack using the unit cell, wherein collector plates including an air inlet/outlet and a fuel inlet/outlet is used to facilitate stacking of unit cells and sealing of the unit cells with a manifold, and (3) a method of manufacturing the unit cell to reduce a manufacturing time required for a continuous process.

According to one aspect of the present invention, provided is a unit cell for a solid oxide fuel cell (SOFC), the unit cell including: a fuel electrode unit having a gas channel formed therein for fuel flow; a frame formed of a same material with an electrolyte material and configured to contact and surround the fuel electrode unit and include an aperture formed in a central part that is in contact with a bottom surface of the fuel electrode unit; an interconnector coated on the aperture of the frame and configured to contact the bottom surface of the fuel electrode unit; and an air electrode unit coated on an upper surface of the frame that is in contact with an upper surface of the fuel electrode unit, wherein the frame includes a fuel inlet/outlet and an air inlet/outlet, wherein the fuel inlet/outlet penetrates front and rear surfaces of the frame in a vertical direction to be connected with each of both ends of the gas channels of the fuel electrode unit, and the air inlet/outlet penetrates both side surfaces of the frame in a vertical direction to supply air to the air electrode unit.

The SOFC used herein refers to a so-called a third-generation fuel cell, having oxygen or hydrogen ion conductivity and operating at high temperatures (about 700° C. to about 1,000° C.), and using a solid oxide as an electrolyte. A typical SOFC includes an electrolyte having oxygen ion conductivity; and an air electrode unit (cathode unit) and a fuel electrode unit (anode unit) that are positioned on both surfaces of the electrolyte. Oxygen ions produced by a reduction reaction of oxygen in an air electrode are transported to a fuel electrode through the electrolyte, and then, reacts with hydrogen supplied to the fuel electrode, thereby generating water. Here, electrons are generated in the fuel electrode, and since electrons are consumed in the air electrode, thereby generating currents by connecting the fuel electrode and the air electrode with each other.

The unit cell of the SOFC may be classified into a planar type and a tubular type according to a shape of the unit cell, and the tubular type may be further classified into a circular tube type and a flat tube type. A flat tube-type SOFC generally has advantages of a tubular-type fuel cell and a planar-type fuel cell in combination. Here, fuel and air are each injected from side surfaces of a stack using the unit cells to generate electricity. To allow even flows of air or fuel from the side surface of the stack, the stack needs to be sealed or housed. However, the unit cell of flat tube-type SOFC of an embodiment of the present invention includes a fuel inlet/outlet and an air inlet/outlet formed therein in a vertical direction, and thus an additional housing is not required. In addition, the unit cell of flat tube-type SOFC of an embodiment of the present invention may include a device, such as a manifold, that is capable of adjusting the air flow in a bottom layer of the unit cell.

FIG. 1 is a cross-sectional view illustrating a cross section of a unit cell of an SOFC according to an embodiment. A unit cell of a flat tube-type SOFC of an embodiment of the present invention includes a fuel electrode (anode) unit 20, an air electrode (cathode) unit 40, a frame 10 formed of a same material with an electrolyte material, and an interconnector 30. The fuel electrode (anode) unit 20 may have a hexahedron shape and include at least one gas channel 22 that penetrates a first surface (i.e., a front surface) of the hexahedron to a rear surface (i.e., a surface opposite to the first surface) of the hexahedron. In an embodiment, hydrogen-containing fuel gas may flow in the gas channels 22. The gas channels 22 are not limited to the description above, and but may be in a tube, lattice, or honeycomb type. The frame 10 formed of a same material with an electrolyte material may contact and surround front, rear, top, bottom, and side surfaces of the fuel electrode (anode) unit 20, and may include an aperture 18 in a central part that is in contact with a bottom surface of the fuel electrode (anode) unit 20. That is, the frame 10 of an embodiment of the present invention is configured to surround the fuel electrode (anode) unit 20, except some portions of the bottom surface of the fuel electrode (anode) unit 20 due the aperture 18 formed therein. Since the frame 10 is formed of an ion conductive material, the frame 10 may serve as both an electrolyte and a frame at the same time. In an embodiment, a material for forming the frame 10 may include $Y_2O_3$-doped zirconia in a concentration of about 3 mol % to about 8 mol %. The unit cell of the SOFC of an embodiment of the present invention includes a fuel inlet/outlet 12 and an air inlet/outlet 14, wherein the fuel inlet/outlet 12 is formed in the frame and connected with the gas channels 22 by penetrating parts in a vertical direction that are in contact with front and rear parts of the fuel electrode (anode) unit 20, and the air inlet/outlet 14 penetrates side parts in a vertical direction that are in contact with both side surfaces of the fuel electrode (anode) unit 20. The air inlet/outlet 14 is placed in the fuel electrode (anode) unit 20, but is formed on the frame 10, and thus the fuel electrode (anode) unit 20 may be positioned inside the frame 10 without an exposure. Here, an inner surface of the air inlet/outlet 14 is formed of a same material with the material for forming the frame 10. In this regard, the fuel electrode (anode) unit 20 of an embodiment of the present invention does not require an additional sealing process upon the exposure of the fuel electrode (anode) unit 20, and accordingly, an automatic production process may be easily applied in an embodiment of the present invention. The fuel electrode (anode) unit 20 exposed by the aperture 18 of the frame 10 and a part that is in contact with the aperture 18 of the frame 10 are coated with the interconnector 30, and accordingly, an air electrode (cathode) unit 40 is coated on an outer surface of an upper surface of the frame facing the aperture 18 of the frame 10, wherein the fuel electrode (anode) unit 20 is disposed between the aperture 19 of the frame and frame facing the aperture 18 of the frame 10. In an embodiment, the aperture 18 of the frame 10 may be one or more polygons or circles.

Figure 2:
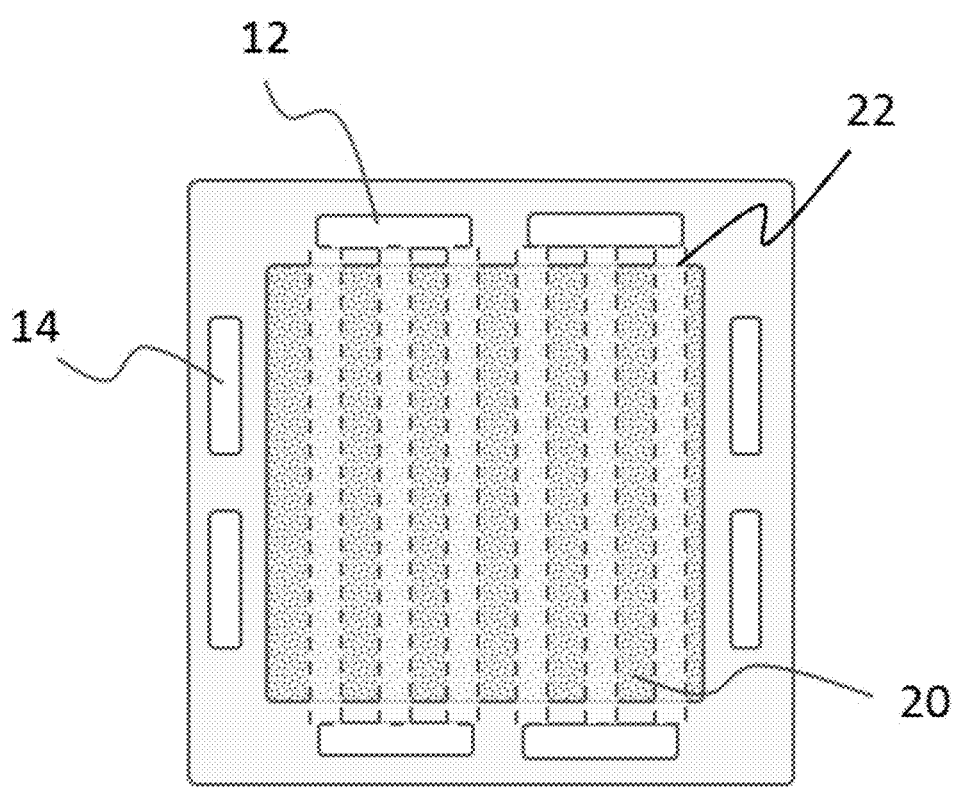
FIG. 2 is a plan view of a unit cell of an SOFC according to an embodiment.

FIG. 2 is a plan view of the unit cell of the SOFC according to an embodiment. Referring to FIG. 2, the unit cell includes the fuel electrode (anode) unit 20 having at least one gas channel 22, the frame 10 surrounding front, rear, bottom, and both side surfaces of the fuel electrode (anode) unit 20, wherein the frame 10 includes the fuel inlet/outlet 12 that is connected with the gas channel 22 of the fuel electrode (anode) unit 20 and the air inlet/outlet 14 that is configured to inject air. Air flows through one side of the air inlet/outlet 14, and oxygen in the air in contact with the electrode unit (cathode) 40 is supplied to the electrode unit (cathode) 40 through the other side of the air inlet/outlet 14. Then, the remaining air is discharged.

Figure 3:
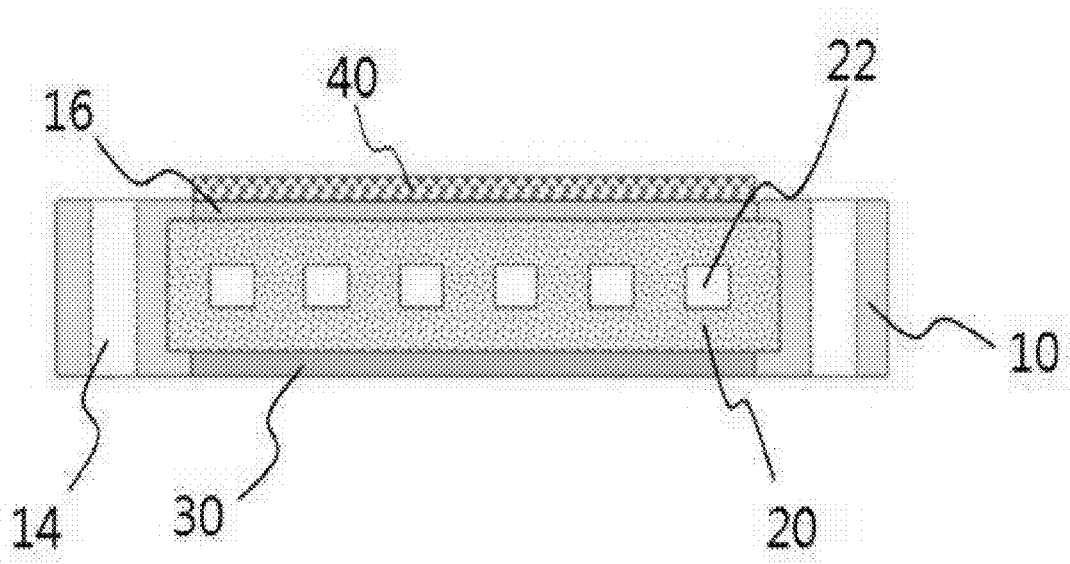
FIG. 3 is a cross-sectional view of a unit cell of an SOFC according to an embodiment in which an upper surface of a frame constituting the SOFC is formed of a different material from a material used for forming an electrolyte frame.

FIG. 3 is a cross-sectional view illustrating a unit cell of an SOFC according to an embodiment of which an upper surface of a frame is formed of a different electrolyte material. The electrolyte material used herein may be 3 mol % $Y_2O_3$-doped zirconia, and the upper surface in contact with the air electrode (cathode) unit 40 is formed of a different electrolyte material 16 from the frame material. The different electrolyte material 16 may be at least one of selected from zirconia including Y, Sc, or Yb, ceria including Y, Gd, or Sm, and LaGaO$_3$ including both Sr and Mg. The frame of the unit cell of the SOFC is formed of ion conductive materials, but a portion of the frame in contact with the upper surface of the fuel electrode (anode) unit 20 may be formed of an electrolyte material having high conductivity. The material for forming the frame may have a relatively good mechanical strength, and an example thereof is 3 mol % Y$_2$O$_3$-doped zirconia. The material for forming the electrolyte layer may have excellent ion conductivity, and examples thereof are zirconia including Y, Sc, or Yb, ceria including Y, Gd, or Sm, and LaGaO$_3$ including both Sr and Mg. Accordingly, excellent durability and high output efficiency may be implemented.

Figure 4:
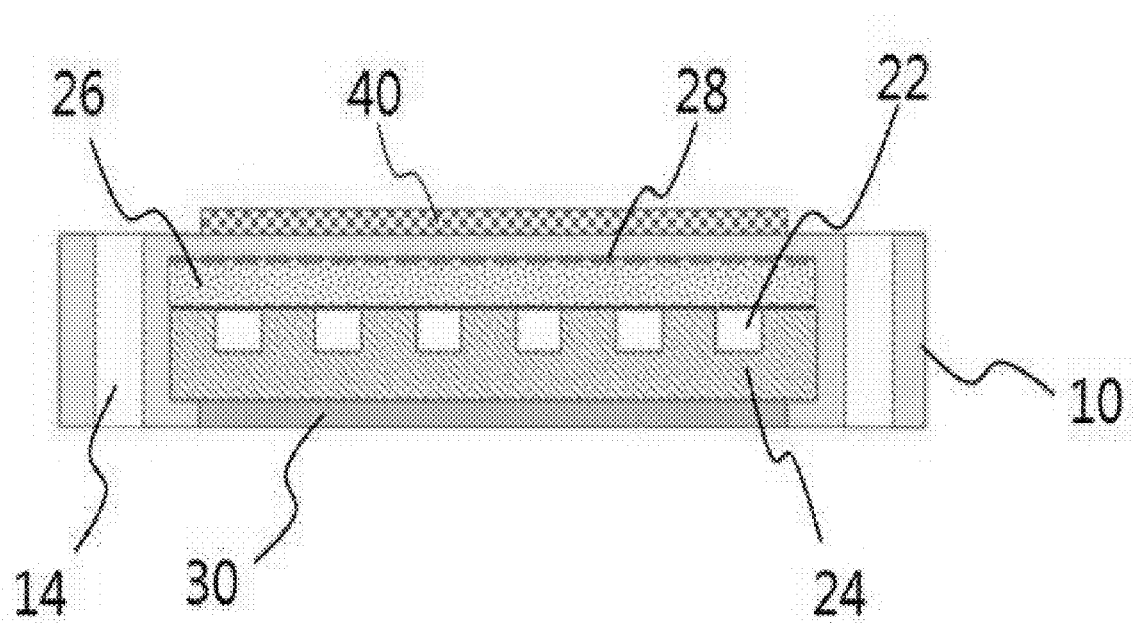
FIG. 4 is a cross-sectional view of a unit cell of an SOFC according to an embodiment in which a fuel electrode (anode) unit includes a fuel diffusion layer and a fuel electrode support that have a different porosity from each other.

FIG. 4 is a schematic view illustrating a cross section of a unit cell of a SOFC having a fuel electrode (anode) unit 20 in a different configuration. The unit cell of the SOFC having a different configuration of the fuel electrode (anode) unit 20 may include a fuel diffusion layer 26 and a fuel electrode support 24 that have different porosities from each other, wherein the fuel diffusion layer 26 has a porosity of at least about 30% and an upper surface of the fuel diffusion layer 26 is in contact with an inner surface of the frame 10 while a bottom surface of the fuel diffusion layer 26 is in contact with the fuel electrode support 24, thereby forming the gas channels 22. To improve mechanical durability of the unit cell of the SOFC, the fuel diffusion layer 26 and the fuel electrode support 24 may be formed of different materials or may be formed to have different porosities from each other. For example, materials for forming the fuel electrode support 24 and the fuel diffusion layer 26 may be equally Ni-3% YSZ, but to improve mechanical durability, the fuel electrode support 24 may be formed to have a relatively small porosity while the fuel diffusion layer 26 may be formed to have a porosity of at least about 30% to facilitate delivery of the fuel to the electrolyte. Alternatively, the fuel diffusion layer may be formed of Ni-8% YSZ and may be formed to have porosity of at least about 30%. The fuel diffusion layer 26 and the fuel electrode support 24 formed in different porosities or material configurations may improve durability thereof, and accordingly, the unit cell of the SOFC may be formed to have a small thickness. In an embodiment, an electrochemically active layer 28 may be additionally positioned between the fuel diffusion layer 26 and the inner surface of the upper surface of the frame 10, and the active layer is used to facilitate an oxidation reaction of the fuel (H$_2$+O$^{-2}$→H$_2$O+2$e^-$). The active layer may be formed of fine Ni-fine YSZ, but not limited thereto.

The material for forming the fuel electrode (anode) unit in the unit cell of the SOFC may be a composite of an ion conductive electrolyte material and at least one selected from nickel, a nickel alloy, and an iron-based alloy, wherein conductive electrolyte material is at least one selected from yttria-stabilized zirconia (YSZ), scandia-stabilized zirconia (ScSZ), Gd doped-ceria (GDC), Sm doped-ceria, and lanthanum gallates, but not limited thereto.

The material for forming the air electrode (cathode) unit in the unit cell of the SOFC may be at least one selected from lanthanum strontium cobalt ferrite (LSCF), lanthanum strontium manganite (LSM), and lanthanum strontium cobatite (LSC), but not limited thereto.

The interconnector used in the unit cell of the SOFC may be ceramic or a composite of ceramic and an ion conductive electrolyte material. When manufacturing a cell stack including a plurality of the unit cells laminated on one another, the interconnector connects one unit cell with another unit cell so that electricity may flow therebetween. In an embodiment the interconnector may be selected from ceramic and a composite of ceramic and an ion conductive electrolyte material, wherein the ceramic is at least one selected from strontium titanium ferrite (SrTi$_{1-x}$Fe$_x$O$_{3-\delta}$, STF), lanthanum strontium ferrite, LSF), LSF including Sc, lanthanum calcium ferrite (LCF), lanthanum strontium manganite (LSM), lanthanum strontium cobatite (LSC), lanthanum strontium chromite (LSCr), lanthanum strontium cobalt ferrite (LSCF), manganese ferrite (MnFe$_2$O$_4$), and nickel ferrite (NiFe$_2$O$_4$), and the ion conductive electrolyte material is at least one selected from Gd doped-ceria (GDC) and La doped-ceria. When the ceramic interconnector is used, the corrosion in high-temperature environments does not occur, the manufacturing cost is low, and it is possible to lighten the weight of the SOFC.

In an embodiment, the fuel electrode (anode) unit, the air electrode (cathode) unit, and the interconnector of the unit cell of the SOFC may have fine irregularities on a surface thereof, or may have a porous surface to facilitate the air or fuel supply, thereby improving efficiency of the electricity generation. In another embodiment, the fuel electrode unit may be a composite of Ni and YSZ, the interconnector may be a composite of GDC and LSF including Sc or a composite of LCF and GDC, and a composite layer of Ni and GDC may be additionally positioned between the fuel electrode unit and the interconnector. A material for forming the fuel electrode unit may be a porous composite of Ni and YSZ, and a material for forming the interconnector may be a composite of LSF and GDC. However, in consideration of the structure of the unit cell, hydrogen is diffused to the anode unit in a hydrogen atmosphere, and thus the inclusion of LSF in the interconnector may cause decomposition of the interconnector upon diffused hydrogen. Such a decomposition phenomenon of the LSF may be suppressed by adding Ss to the LSF, and thus, LSFSc including LSF and Sc is used to prevent such a decomposition phenomenon.

Figure 9A:
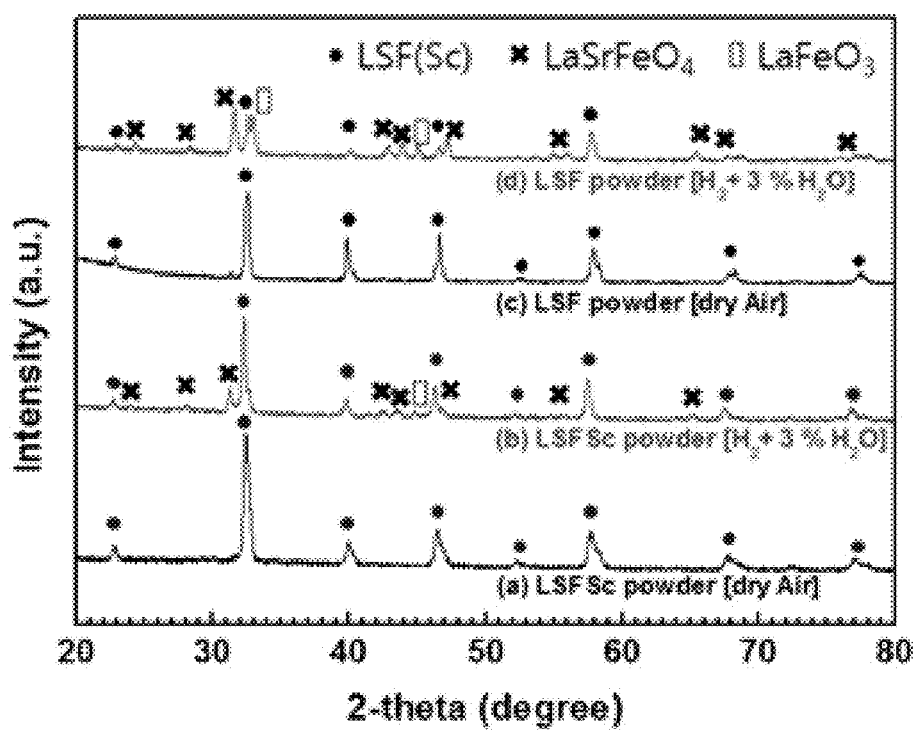
FIG. 9A is a graph showing x-ray diffraction (XRD) patterns for comparing decomposition of lanthanum strontium ferrite (LSF) with that of LSF including scandium (Sc) ((LSF(Sc)) in a reduction atmosphere.
Figure 9B:
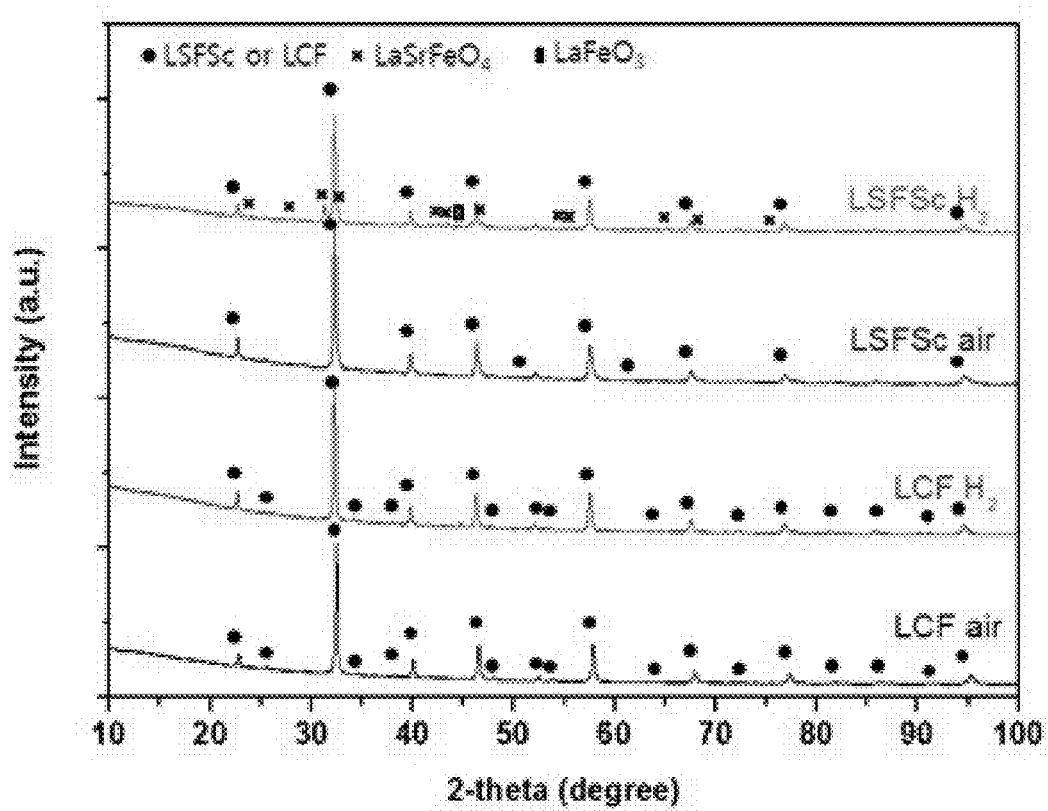
FIG. 9B is a graph showing XRD patterns for comparing decomposition of LSF(Sc) with that of lanthanum calcium ferrite (LCF).

FIG. 9A is a graph showing x-ray diffraction (XRD) patterns for comparing decomposition of LSF (LSFSc) including LSF and Sc in a reduction atmosphere. As a result of analyzing the XRD patterns in consideration of the air quality and reduction conditions (H$_2$+3% H$_2$O) of the LSF, it is confirmed that the LSF is decomposed while LaSrFeO$_4$ and LaFeO$_3$ are generated. In addition, as a result of analyzing the XRD patterns in consideration of the air quality and reduction conditions (H$_2$+3% H$_2$O) of the La$_{0.6}$Sr$_{0.4}$Fe$_{0.9}$Sc$_{0.1}$O$_3$-(LSFSc) including 10 mol % Sc, it is confirmed that the LSF is decomposed while LaSrFeO$_4$ and LaFeO$_3$ are generated. Although LaSrFeO$_4$ and LaFeO$_3$ are generated from the LSFSc in the reduction conditions, LSFSc is decomposed in a relatively insignificant amount. In addition, referring to FIG. 9B, XRD patterns of La$_{0.8}$Ca$_{0.2}$FeO$_3$-d(LCF) and LSFc may be compared to each other in consideration of the air quality and reduction conditions. As a result, it is confirmed that LaSrFeO$_4$ and LaFeO$_3$ are less likely to be generated from LCF than LSFc in the reduction conditions (H$_2$+3% H$_2$O). That is, LCF is not easily decomposed under reduction conditions in the hydrogen atmosphere. LCF may have conductivity of about 100 S/cm under oxidation conditions and about 1 S/cm under reduction conditions. Therefore, it is preferable to use the interconnector that is formed of a LSFSc-GDC composite of a LCF-GDC composite. When a Ni-YSZ composite and a LSFSc-GDC composite are used, layers of two composites may be delaminated. Therefore, to prevent such delamination, in an embodiment, a Ni-GDC layer may be disposed between layers of the Ni-YSZ composite and the LSFSc-GDC composite.

According to another aspect of the present invention, provided is a solid oxide fuel cell (SOFC) stack using the unit cell described above, the stack including: a plurality of unit cells, each of which includes a fuel inlet/outlet and an air inlet/outlet formed in a frame, wherein the plurality of the unit cells are sequentially laminated to locate an air flow layer between an air electrode unit equipped with one of the plurality of the unit cells and an interconnector equipped with the other one of the plurality of the unit cells; the airflow layer includes a frame border equipped with a fuel inlet/outlet and an air inlet/outlet, and the plurality of the unit cells are connected with each of the air inlet/out and the fuel inlet/outlet of the airflow layer; each of the plurality of the unit cells includes a fuel electrode unit having a gas channel formed therein for the fuel; a framed formed of an electrolyte material and configured to contact and surround the fuel electrode unit and have an aperture in the middle of a portion that is in contact with a bottom surface of the fuel electrode unit; an interconnector coated on the aperture of the frame and configured to contact a bottom surface of the fuel electrode unit; and an air electrode unit coated on a top surface of a portion of the frame that is in contact with a top surface of the fuel electrode unit, wherein the frame includes a fuel inlet/outlet connected to each of both ends of a gas channel of the fuel electrode unit and passing vertically through a front surface and a back surface of the frame; and an air inlet/outlet penetrating vertically through side surfaces of the frame to supply air to the air electrode.

Figure 5A:
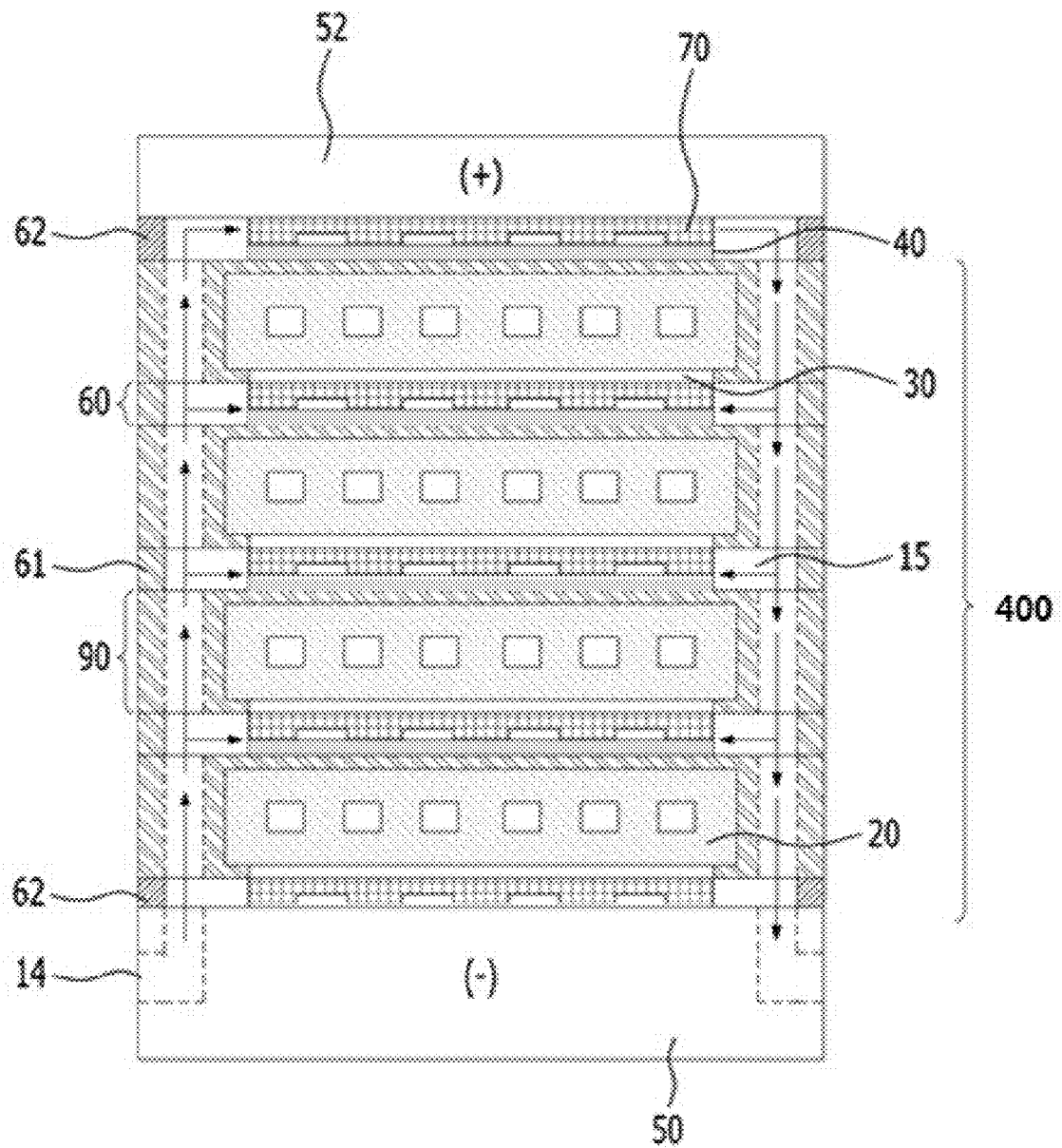
FIG. 5A is a cross-sectional view of a stack of an SOFC according to an embodiment.

FIG. 5A is a cross-sectional view of a stack of an SOFC according to an embodiment. The stack is lamination 400 including a plurality of unit cells 90 that are sequentially laminated on one another so that an airflow layer 60 is disposed between the laminated unit cells, wherein the airflow layer 60 is positioned between an air electrode unit 40 of one unit cell of the plurality of the unit cells and an interconnector 30 of the other unit cell of the plurality of the unit cells. The airflow layer 60 may include a border 61, which is formed of a same material for forming the frame of the unit cell, and an airflow unit 70. A portion to be sealed between plurality of the unit cells is sealed by the border 61 of the airflow layer 60. Thus, no additional sealing process is required to seal the portion between the plurality of the unit cells. In addition, since the border 61 is formed of a same material for forming the frame of the unit cell, the portion to be sealed may have improved stability and durability. In an embodiment, the stack may include a metal top plate 52, which is in contact with an air inlet/outlet, and a metal bottom plate 50, which includes an air inlet/outlet and a fuel inlet/outlet. The metal top plate 52 and the metal bottom plate 50 may include a metal-ceramic sealing layer 62 on a border thereof, and for example, mica or glass may be used as the sealing layer 62. In an embodiment, a material for forming the frame of the stack may be 3 mol % $Y_2O_3$-doped zirconia, and a top portion of the frame that is in contact with the air electrode is formed of a different electrolyte material. For example, the different electrolyte material may be at least one selected from zirconia including Sc or Yb, ceria including Y, Gd, or Sm, and $LaGaO_3$ including both Sr and Mg. The frame of the unit cell is connected to each of the fuel inlet/outlet configured to penetrate a front part and a rear part of the border of the airflow layer in a vertical direction, and then, the fuel inlet/outlet is connected with the gas channel of each of the plurality of the unit cells to allow fuel passage. In addition, the frame of the unit cell is connected to each of the air inlet/outlet 14 configured to penetrate both side surfaces of the border of the airflow layer in a vertical direction to allow air passage in association with the airflow unit of the airflow layer.

Figure 5B:
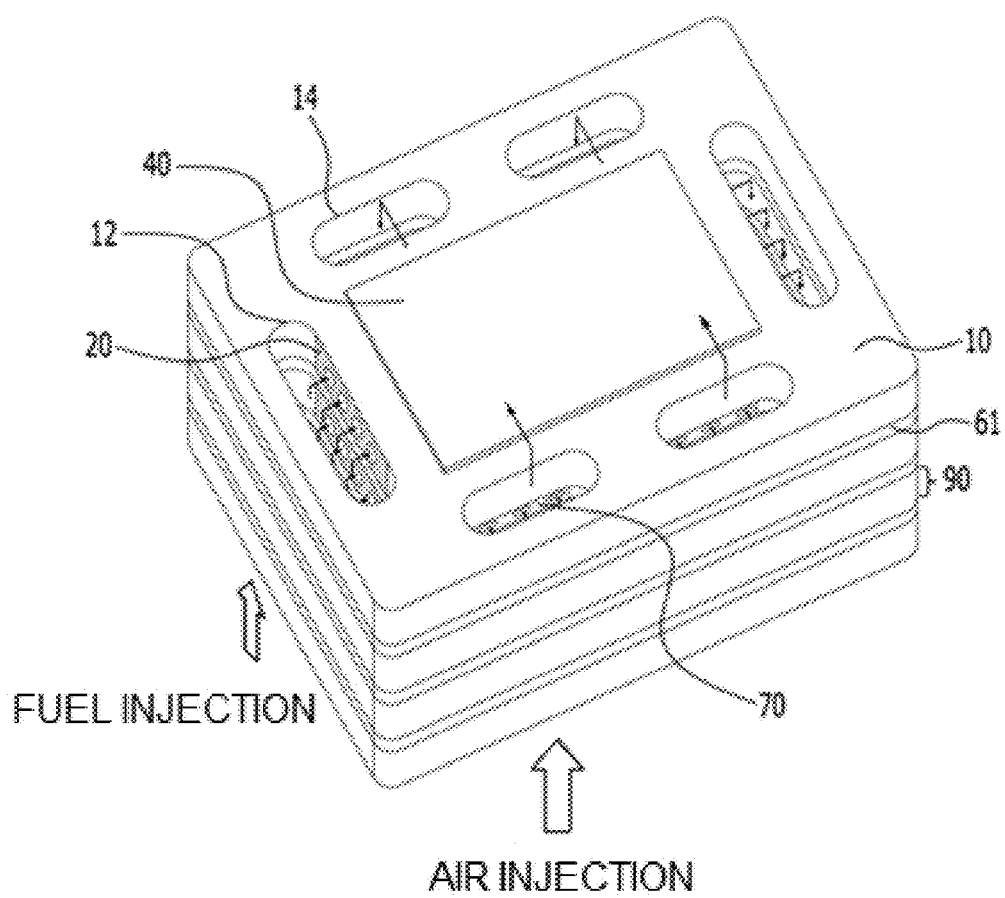
FIG. 5B is a perspective view illustrating flows of air and fuel in a stack of an SOFC according to an embodiment.

Referring to FIG. 5B, in consideration of the flows of air and fuel, a unit cell 90 and an airflow layer are sequentially and repeatedly laminated each other, such that the fuel inlet/outlet 12 on the frame 10 of each of the laminated unit cells and the front and rear parts of the border 61 of the airflow layer is connected with the fuel electrode unit 20 of each of the plurality of the unit cells. In addition, the air inlet/outlet 12 on both side surfaces of the frame 10 of each of the laminated unit cells and the border 61 of the airflow layer is connected with the airflow unit 70 of the airflow layer. Thus, air may pass through the air inlet/outlet 14 and the airflow unit 70 only while fuel may pass through the fuel inlet/outlet 12 and the gas channels only. In the stack according to an embodiment, the airflow unit 70 is in contact with the interconnector of one of the plurality of the unit cells and the air electrode unit of the other one of the plurality of the unit cells. Thus, when the air passes through the airflow unit 70, the air may contact the air electrode unit. In an embodiment, the airflow unit 70 may be in a tube, lattice, or honeycomb type to facilitate the air flow.

According to another aspect of the present invention, provided is a method of manufacturing a unit cell of a solid oxide fuel cell (SOFC). The method includes: preparing an upper layer of a frame, upper/intermediate/bottom layers of a fuel electrode unit, and an interconnecting layer, wherein the upper layer of the frame is formed of a same material with an electrolyte material; the upper/intermediate/bottom layers of the fuel electrode unit are surrounded by the frame that includes a first border as a portion of the frame formed of the same material with the electrolyte material and the fuel electrode unit positioned inside the first border; and the interconnecting layer is surrounded by the frame that includes a second border as a portion of the frame formed of the same electrolyte material with the electrolyte material and a ceramic interconnector positioned inside the second border; processing a space for a fuel flow passage unit, the gas channels being extended from a predetermined position on a portion of the first border with respect to the intermediate layer of the fuel electrode unit to a predetermined position on another portion opposite to the one portion of the same first border by penetrating the upper/intermediate/bottom layers of the fuel electrode unit; laminating the interconnecting layer surrounded by the frame, the bottom/intermediate/upper layers of the fuel electrode unit surrounded by the frame, and the upper surface of the frame sequentially in the stated order; processing an air inlet/outlet and a fuel inlet/outlet, wherein the air inlet/outlet penetrates both side surfaces of the laminated frame and the fuel inlet/outlet penetrates front and rear parts of the frame to be connected with the gas channels; manufacturing a half-cell by performing heat treatment on the laminated structure comprising the air inlet/outlet and the fuel inlet/outlet; applying a coating of a material for forming an air electrode unit to a central part of an upper surface of the upper layer of the frame that constitutes the half-cell, thereby manufacturing a coated structure; and; and heat-treating the coated structure.

Figure 6:
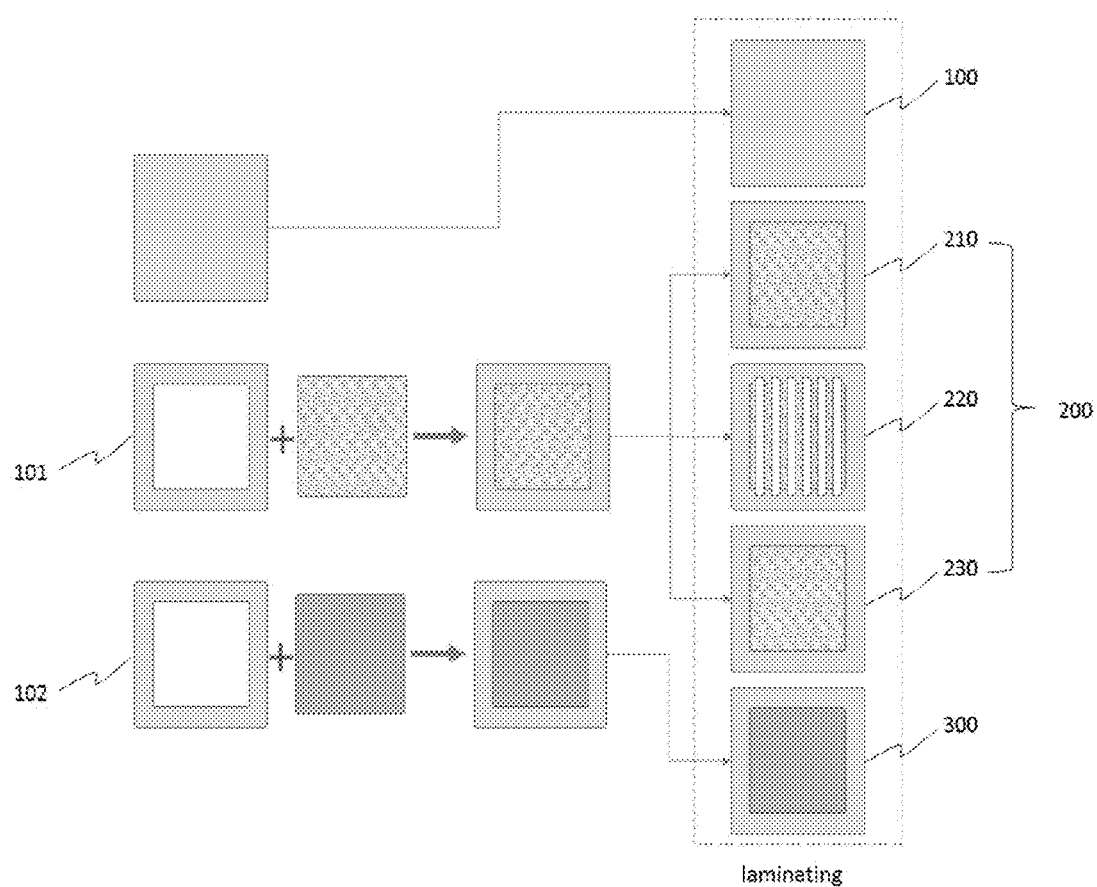
FIG. 6 is a schematic view describing a method of manufacturing a unit cell of an SOFC according to an embodiment in which an upper surface of a frame constituting the SOFC is formed of a same material with a material used for forming an electrolyte frame.

Referring to FIG. 6, a upper layer 100 having a planar rectangular shape and serving as both a an ion conductive layer (i.e., an electrolyte layer), which is formed of a same electrolyte material, and a frame is manufactured, three first borders 101, each of which is formed of a same electrolyte material with the upper layer 100 and serves as a portion of the frame, are prepared, such that the fuel electrode (anode) that will be used on top/intermediate/bottom layers of the fuel electrode (anode) unit is disposed inside the borders, thereby manufacturing top/intermediate/bottom layers 210, 220, and 230 of the fuel electrode unit surrounded by the frame. In addition, one second border 102, which is formed of a same electrolyte material with the upper layer 100 and serves as a portion of the frame, is prepared, and a ceramic interconnector is positioned inside the border, thereby manufacturing a connecting layer. The upper layer 100 of the frame, the top/intermediate/bottom layers of the fuel electrode unit, and the interconnecting layer may be manufactured according to a tape casting technique, wherein the material for forming the frame may include $Y_2O_3$-doped zirconia (3 mol % to about 8 mol %) or $Y_2O_3$-doped zirconia (3 mol %), but a an upper portion of the frame that is in contact with the air electrode unit may be formed of a different electrolyte material from the frame material. The different electrolyte material 16 may be at least one of selected from zirconia including Y, Sc, or Yb, ceria including Y, Gd, or Sm, and $LaGaO_3$ including both Sr and Mg.

The interconnector used in the unit cell of the SOFC may be ceramic or a composite of ceramic and an ion conductive electrolyte material. When manufacturing a cell stack including a plurality of the unit cells laminated on one another, the interconnector connects one unit cell with another unit cell so that electricity may flow therebetween. In an embodiment the interconnector may be selected from ceramic and a composite of ceramic and an ion conductive electrolyte material, wherein the ceramic is at least one selected from strontium titanium ferrite ($SrTi_{1-x}Fe_xO_{3-\delta}$, STF), lanthanum strontium ferrite, LSF), LSF including Sc, lanthanum calcium ferrite (LCF), lanthanum strontium manganite (LSM), lanthanum strontium cobatite (LSC), lanthanum strontium chromite (LSCr), lanthanum strontium cobalt ferrite (LSCF), manganese ferrite ($MnFe_2O_4$), and nickel ferrite ($NiFe_2O_4$), and the ion conductive electrolyte material is at least one selected from Gd doped-ceria (GDC) and La doped-ceria. In a hydrogen atmosphere, LSF including stable Sc or a composite of LCF and GDC may be used.

The fuel electrode (anode) unit layer 200 may be prepared by manufacturing each of the top/intermediate/bottom layers 210, 220, and 230 of the fuel electrode (anode) unit. The fuel electrode (anode) unit including the top and bottom layers 210 and 230 of the fuel electrode (anode) unit may have a planar rectangular shape and is positioned inside of the first border layer to contact the border. According to the same procedure performed on the top and bottom layers 210 and 230 of the fuel electrode (anode) unit, the intermediate layer 220 of the fuel electrode (anode) unit may be positioned inside of the border. Then, a space for the fuel flow extending from a predetermined position on the first border of the intermediate layer of the fuel electrode unit to a predetermined position on an opposite side of the first border may be processed by penetrating the upper/intermediate/bottom layers of the fuel electrode unit. In an embodiment, when manufacturing the top/intermediate/bottom layers 210, 220, and 230 of the fuel electrode (anode) unit, the fuel electrode (anode) constituting the upper layer of the fuel electrode (anode) unit may have a porosity that is identical to or different form a porosity of the intermediate/bottom layers of the fuel electrode (anode) unit, wherein the upper layer of the fuel electrode (anode) unit has a porosity of at least about 30%. The gas channels formed in the intermediate layer 220 of the fuel electrode (anode) unit may be in a tube, lattice, or honeycomb type. In an embodiment, the material for forming the fuel electrode (anode) unit may be a composite of an ion conductive electrolyte material and at least one selected from nickel, a nickel alloy, and an iron-based alloy, wherein the ion conductive electrolyte material is at least one selected from yttria-stabilized zirconia (YSZ), scandia-stabilized zirconia (ScSZ), Gd doped-ceria (GDC), Sm doped-ceria, and lanthanum gallates. The bottom/intermediate/upper layers 230, 220, and 210 of the fuel electrode (anode) unit are sequentially laminated on one another, thereby completing the manufacture of the fuel electrode (anode) unit layer including the gas channels formed in the middle. In an embodiment, to prevent damages on the gas channels on the fuel electrode (anode) unit upon a high-pressure during the lamination, the intermediate layer 220 of the fuel electrode (anode) unit is filled with materials that will be burned in the heat treatment for lamination.

When the interconnecting layer 300, the fuel electrode (anode) unit layer 200, and the upper layer 100 are sequentially laminated in the stated order, the frame is configured to surround the fuel electrode (anode) unit. In the laminated structure, the air inlet/outlet is processed by penetrating the upper layer 100 on the front and rear parts of the frame, the fuel electrode (anode) unit layer 200, and the interconnecting layer 300. In addition, the air inlet/outlet is processed to be formed inside the frame by penetrating the upper layer 100 on the front and rear parts of the frame, the fuel electrode (anode) unit layer 200, and the interconnecting layer 300 without penetrating the fuel electrode (anode) unit. The laminated structure including the processed air inlet/outlet and the fuel inlet/outlet is subjected to the heat treatment, thereby manufacturing a half-cell. Then, a material layer for the air electrode (cathode) unit is coated in the middle of a frame upper surface of the half-cell, followed by being subjected to the heat treatment, thereby manufacturing the unit for the SOFC. In an embodiment, the coating of the material layer for the air electrode (cathode) unit may be performed by screen printing, but not limited thereto.

Figure 7:
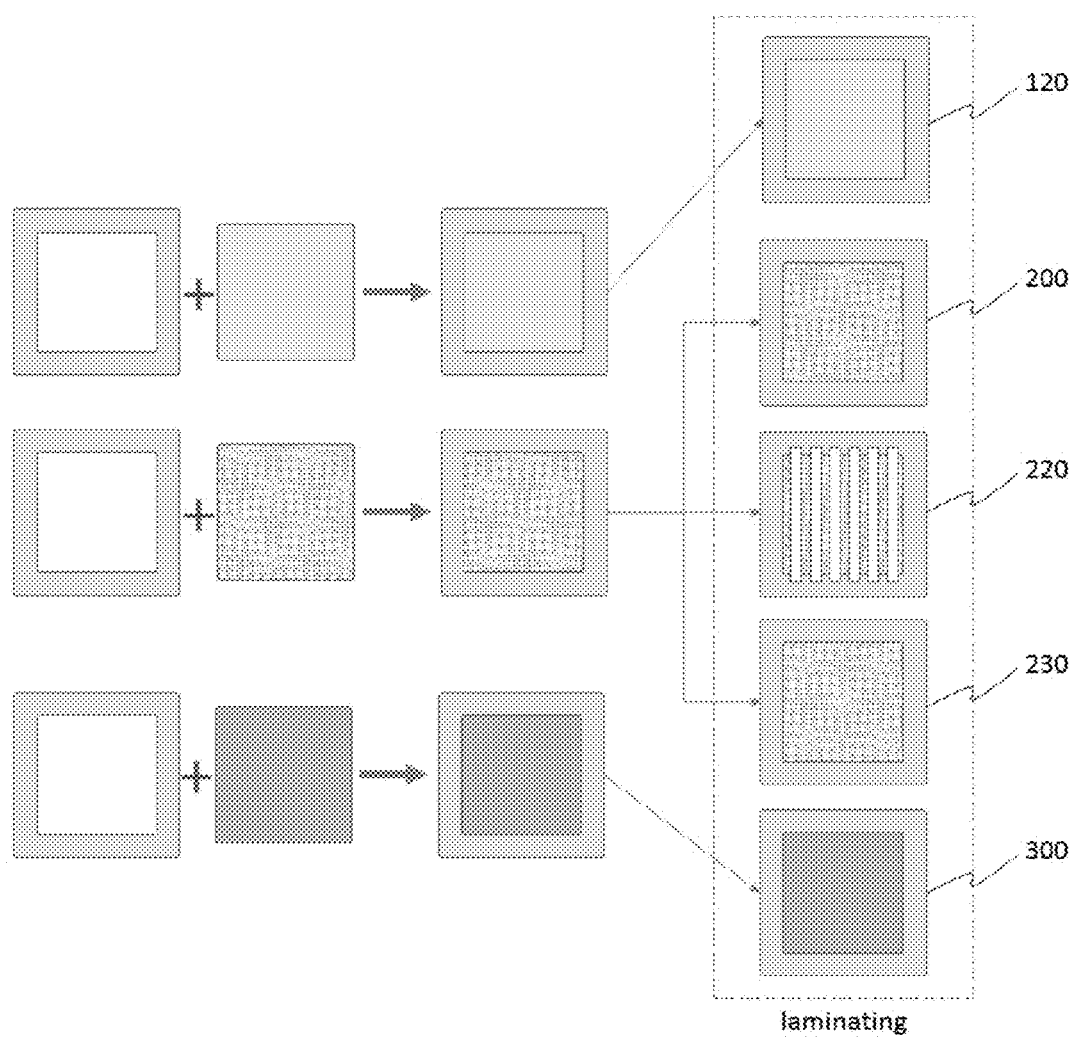
FIG. 7 is a schematic view describing a method of manufacturing a unit cell of an SOFC according to an embodiment in which an upper surface of a frame constituting the SOFC is formed of a different material from a material used for forming an electrolyte frame.

FIG. 7 is a schematic view illustrating a method of manufacturing a unit cell of a SOFC according to an embodiment, wherein the SOFC includes, in the middle of an upper layer that serves as both an electrolyte and a frame, an electrolyte layer 120 using a different electrolyte material. The upper layer serving as a frame (i.e., a top frame layer) that is formed of a same electrolyte material of an embodiment of the present invention includes an electrolyte of a different material that will serve as an ion conductive layer in the middle of the top frame layer. The electrolyte of the different material may be at least one selected from zirconia Y, Sc, or Yb, ceria including Y, Gd, or Sm, or $LaGaO_3$ including both Sr and Mg. In addition, a border including the ion conductive layer in the middle may be manufactured according to a tape casting technique. That is, according to the method of manufacturing the unit cell for the fuel electrode, the unit cell is manufactured in a border shape rather than a planar rectangular shape when manufacturing the top frame layer, and inside the border, the electrolyte of the different material is placed to contact the border. A layer serving as the fuel electrode (anode) unit, a layer serving as each portion of the frame, and a layer serving as the interconnector are not limited to the description above. The layers may be manufactured according to a tape casting technique, and may be processed using laser cutting, ultrasound cutting, and mechanical treatment.

Figure 8:
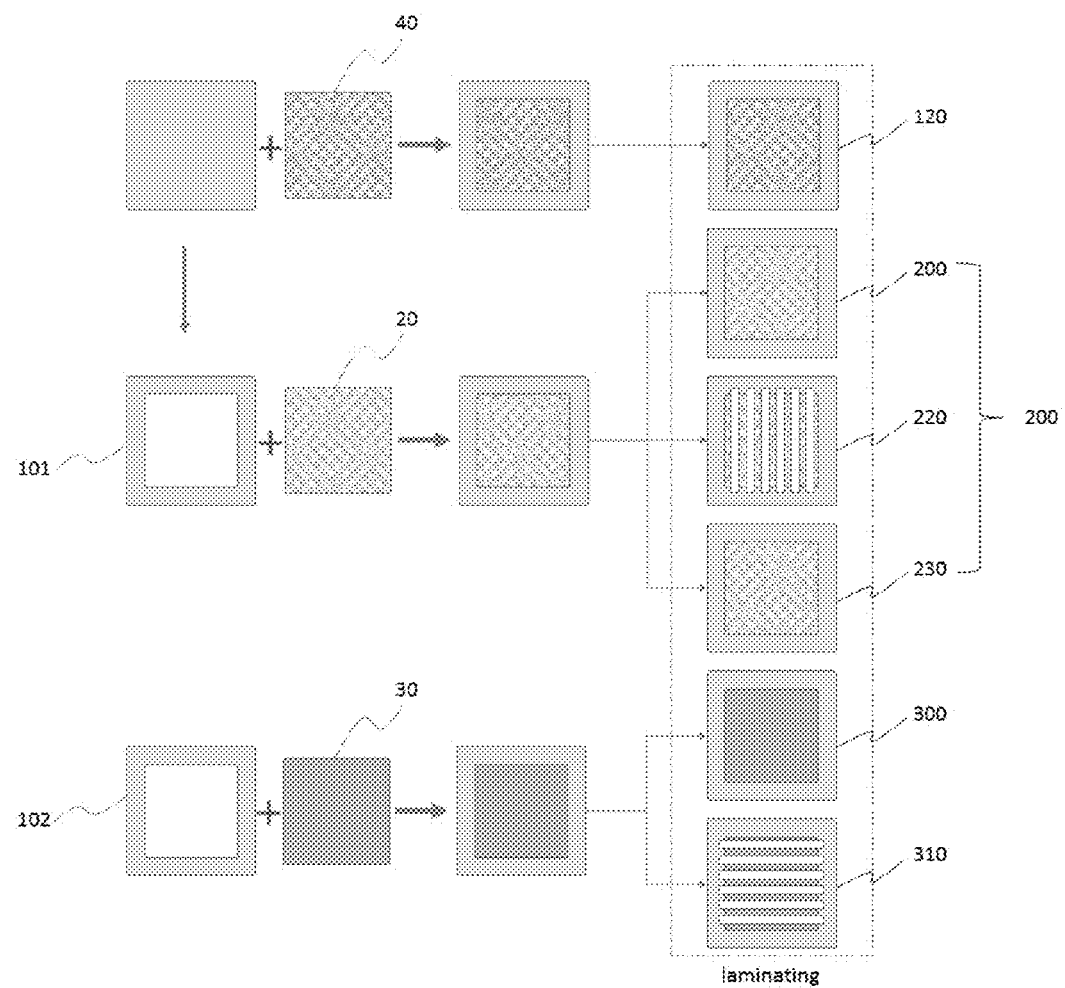
FIG. 8 is a schematic view describing a method of manufacturing a stack of an SOFC according to an embodiment.

According to another aspect of the present invention, provided is a method of preparing a stack of a solid oxide fuel cell (SOFC) using the unit cell. The method may be also referred to as a method of preparing a stack of an SOFC stack according to a tape casting technique. As shown in FIG. 8, the method includes:

preparing a plurality of upper layers 110 of a frame, a plurality of upper/intermediate/bottom layers 210, 220, and 230 of a fuel electrode unit, a plurality of interconnecting layers 300, and a plurality of airflow layers 310, wherein each of the plurality of the upper layers 100 of the frame has a surface coated with an air electrode (cathode) unit 40, each of the plurality of the upper/bottom layers 210 and 230 of the fuel electrode unit includes a plurality of first borders, each of which serves as a portion of the frame and includes a fuel electrode unit, each of the plurality of the intermediate layers 220 includes a gas channel, each of the plurality of the interconnecting layers 300 includes a plurality of second borders, each of which serves as a portion of the frame and includes an interconnector, and each of the plurality of the airflow layers 310 includes the plurality of the second borders, each of which includes an airflow unit;

laminating one of the plurality of the airflow layers 310, one of the plurality of the interconnecting layers 300, one of the plurality of the bottom layers 230 of the fuel electrode unit, one of the plurality of the intermediate layers 220 of the fuel electrode unit, one of the plurality of the upper layers 210 of the fuel electrode unit, and one of the plurality of the upper layers 100 of the frame sequentially in the stated order, thereby manufacturing a laminated frame;

processing an air inlet/outlet and a fuel inlet/outlet, wherein the air inlet/outlet penetrates both side surfaces of the laminated frame in a vertical direction to be connect with the airflow unit, and the fuel inlet/outlet penetrates front and rear surfaces of the frame in a vertical direction to be connected with the gas channels;

manufacturing a laminated structure by repeating the laminating and the processing by a predetermined number of times to have a bottom surface of the airflow layer 310 in contact with the upper layer 100 of the frame and to connect the air inlet/outlet and the airflow unit with each other; and heat-treating the laminated structure.

The upper, intermediate, and bottom layers 210, 220, and 230 of the fuel electrode unit form a fuel electrode unit layer 200, wherein the intermediate and bottom layers 220 and 230 of the fuel electrode unit may each serve as a support of the fuel electrode and the top frame layer 210 of the fuel electrode unit may serve as an active layer, thereby manufacturing the support and the active layer of the fuel electrode having different porosities from each other. In the method of preparing the SOFC stack of an embodiment of the present invention, the top frame layer and the borders of each layer constitute the frame of the SOFC. That is, the method of preparing the SOFC stack of an embodiment of the present invention is more simplified than the method using tape casting, and requires no additional sealing process.

When laminating unit cells according to a manufacturing method of a stack known in the art, problems may occur due to the use of a mica or glass sealant for sealing each of the unit cells. For example, problems include pollution of electrodes by deterioration of a sealant and performance degradation of a cell, and there may be a disadvantage of performing an additional manual sealing process. However, the method of preparing the stack according to an embodiment of the present invention replace the sealant by the borders of the airflow layer in terms of sealing each of the unit cells being stacked on one another In this regard, the stack prepared according to the method of an embodiment of the present invention may be subjected to a one-step sintering. In addition, since such borders are made of the same material with the frame (i.e., an electrolyte), the above-described problems may be minimized or reduced, and accordingly there may be advantages of a reduced manufacturing time and cost savings.

The airflow layer 310 is a layer on which an airflow unit is formed to supply air to the air electrode of the unit cell. The airflow unit for allowing air passage according to an embodiment is not particularly limited, and may be prepared in a planar, lattice, or honeycomb shape, or may be in the form of a metal mesh or a ceramic felt.

It should be understood that embodiments described herein should be considered in a descriptive sense only and not for purposes of limitation. Descriptions of features or aspects within each embodiment should typically be considered as available for other similar features or aspects in other embodiments.

Unless otherwise defined, all technical and scientific terms used herein have the same meaning as commonly understood by one of ordinary skill in the art. The contents of all publications listed herein will be introduced by reference in an embodiment of the present invention.

What is claimed is:

1. A fuel cell comprising:
a fuel electrode body comprising a first major surface and a second major surface facing away from the first major surface, the fuel electrode body further comprising a plurality of side surfaces connecting the first and second major surfaces, the plurality side surfaces comprising a first side surface and a second side surface facing away from the first side surface;
a frame formed of at least one electrolyte material and comprising a plurality of rim portions which surround the plurality of side surfaces of the fuel electrode body when viewed in a viewing direction perpendicular to the first major surface, the plurality of rim portions comprising a first rim portion extending from the first side surface and a second rim portion extending from the second side surface, the frame further comprising an upper wall disposed on and contacting the first major surface of the furl electrode body;
an interconnector positioned under the fuel electrode body, the interconnector contacting the second major surface of the fuel electrode body;
an air electrode disposed on and contacting the upper wall of the frame, wherein the upper wall is disposed between the air electrode and the fuel electrode body;
a first vertical gas channel formed through the first rim portion;
a second vertical gas channel formed through the second rim portion; and
at least one horizontal gas channel formed through the fuel electrode body and disposed between the first major surface and the second major surface, the at least one horizontal gas channel extending between the first and second vertical gas channels.

2. The fuel of claim 1, wherein the frame is made of 3 mol % to 8 mol % of $Y_2P_3$-doped zirconia.

3. The fuel cell of claim 2, wherein the upper wall of the frame is made of an electrolyte material that is different from the rest of the frame and selected from the group consisting of zirconia doped with scandium (Sc) or ytterbium (Yb), ceria doped with yttrium (Y), gadolinium (Gd), or samarium (Sm), and $LaGaO_3$ dope with strontium (Sr) and magnesium (Mg).

4. The fuel cell of claim 1, wherein the fuel electrode body comprises a composite comprising an ion conductive electrolyte material and at least one selected from the group consisting of a nickel, a nickel alloy, and an iron-based alloy,
wherein the ion conductive electrolyte material comprises at least one selected from the group consisting of a yttria-stabilized zirconia (YSZ), a scandia-a stabilized zirconia (ScSZ), a Gd doped-ceria (GDC), a Sm doped-ceria, and a lanthanum gallates.

5. The fuel cell of claim 1, wherein the interconnector is formed of a ceramic or a composite of a ceramic and an ion conductive electrolyte material,
wherein the ceramic comprises at least one selected from the group consisting of a strontium titanium ferrite (STF), a lanthanum strontium ferrite (LSF), a LSF comprising Sc (LSFSc), a lanthanum calcium ferrite (LCF), a lanthanum strontium manganite (LSM), a lanthanum strontium cobatite (LSC), a lanthanum strontium chromite (LSCr), a lanthanum strontium cobalt ferrite (LSCF), a manganese ferrite ($MnFe_2O_4$) and nickel ferrite ($NiFe_2O_4$), and wherein the ion conductive electrolyte material comprises a Gd doped-ceria (GDC) or a La doped-ceria.

6. The fuel cell of claim 1, wherein the fuel electrode body comprises a fuel diffusion layer and a fuel electrode support that is disposed between the fuel diffusion layer and the interconnector, wherein the fuel diffusion layer has a porosity greater than that of the fuel electrode support,
wherein the fuel diffusion layer has a porosity of at least about 30%, and
wherein the fuel diffusion layer contacts the upper wall of the frame,
wherein the at least one horizontal gas channel is formed between the fuel diffusion layer and the fuel electrode support.

7. The fuel cell of claim 1, wherein the fuel electrode body is formed of a composite comprising nickel (Ni) and YSZ, and
wherein the fuel cell further comprises an Ni-GDC composite layer disposed between the fuel electrode body and the interconnector.

8. The fuel cell of claim 1, wherein the plurality of side surfaces of the fuel electrode body further comprise a third side surface and a fourth side surface facing away from the third side surface,
wherein the plurality of rim portions of the frame further comprise a third rim portion extending from the third side surface and a fourth rim portion extending from the fourth side surface,
wherein the fuel cell further comprises:
a first vertical air channel formed through the third rim portion, and
a second vertical air channel formed through the fourth rim portion.

9. A fuel cell assembly comprising a plurality of fuel cells, each of which is the fuel cell of claim 1, wherein the plurality of fuel cells comprises a first fuel cell and the second fuel cell, wherein the second fuel cell is placed over the first fuel cell such that the first vertical gas channel of the first fuel cell overlaps the first vertical gas channel of the second fuel cell when viewed in the viewing direction and further such that the second vertical gas channel of the first fuel cell overlaps the second vertical gas channel of the second fuel cell when viewed in the viewing direction.

10. The fuel cell assembly of claim 9, wherein the plurality of side surfaces of the fuel electrode body of each fuel cell further comprise a third side surface and a fourth side surface facing away from the third side surface,
wherein the plurality of rim portions of the frame of each fuel cell further comprise a third rim portion extending from the third side surface and a fourth rim portion extending from the fourth side surface,
wherein each fuel cell further comprises:
a first vertical air channel formed through the third rim portion, and
a second vertical air channel formed through the fourth rim portion.

11. The fuel cell assembly of claim 10, wherein the second fuel cell is placed over the first fuel cell such that the first vertical air channel of the first fuel cell overlaps the first vertical air channel of the second fuel cell when viewed in the viewing direction and further such that the second vertical air channel of the first fuel cell overlaps the second vertical air channel of the second fuel cell when viewed in the viewing direction.

12. The fuel cell assembly of claim 11, further comprising a plate disposed between the interconnector of the second fuel cell and the air electrode of the first fuel cell, wherein the plate comprises at least one groove for providing at least one horizontal air channel formed between the plate and the interconnector of the second fuel cell, the at least one horizontal air channel extending between the first and second vertical air channels.

* * * * *